No. 779,547. PATENTED JAN. 10, 1905.
W. S. JUDD.
PROCESS OF MAKING SHOVELS.
APPLICATION FILED MAY 17, 1904.

Witnesses.
E. B. Gilchrist
J. H. Welles

Inventor
Wallace S. Judd,
By his Attorneys,
Thurston & Bates

No. 779,547.

Patented January 10, 1905.

UNITED STATES PATENT OFFICE.

WALLACE S. JUDD, OF CLEVELAND, OHIO, ASSIGNOR OF ONE-HALF TO THE AVERY STAMPING COMPANY, OF CLEVELAND, OHIO, A CORPORATION OF OHIO.

PROCESS OF MAKING SHOVELS.

SPECIFICATION forming part of Letters Patent No. 779,547, dated January 10, 1905.

Original application filed February 13, 1903, Serial No. 143,171. Divided and this application filed May 17, 1904. Serial No. 208,391.

*To all whom it may concern:*

Be it known that I, WALLACE S. JUDD, a citizen of the United States, residing at Cleveland, in the county of Cuyahoga and State of Ohio, have invented a certain new and useful Improvement in Processes of Making Shovels, of which the following is a full, clear, and exact description, reference being had to the accompanying drawings.

The object of the invention is to produce, at comparatively low cost, a shovel of great strength, a shovel consisting of a blade and a tubular socket having on its lower end two integral wings whose upper ends extend laterally on opposite sides of said socket-piece and are integrally connected together at the sides of said socket, said blade being inserted between said wings with its upper edge in contact with the part which unites them and being secured to said wings. This is the form of shovel which forms the subject-matter of my application, Serial No. 143,171, filed February 13, 1903, of which this application is a division.

The present invention is the process of producing said shovel; and it consists in shaping a seamless drawn tube to have one enlarged bell-shaped end, in bifurcating said bell end by kerfs extending up to the end thereof, and then flattening and shaping the two wings formed by so splitting said portion, thereby forming two properly-shaped wings whose upper edges and opposite sides of the tube are integrally connected by what was the neck of the bell part thereof, in inserting a shovel-blade between said wings and securing it to them.

Figure 1:
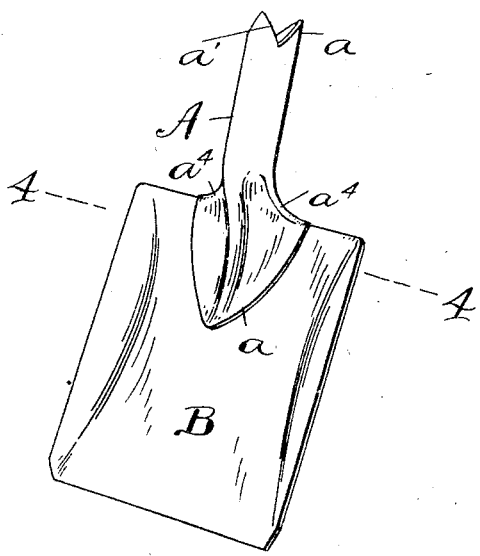
Figure 2:
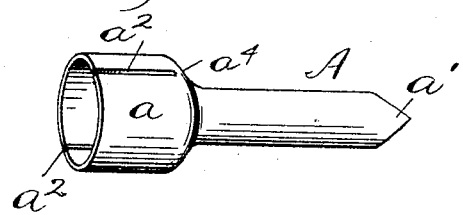
Figure 3:
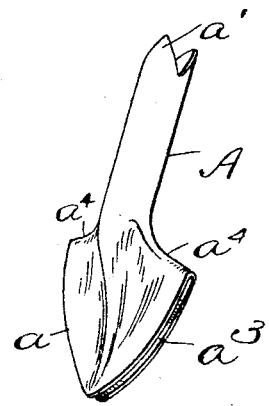
Figure 4:
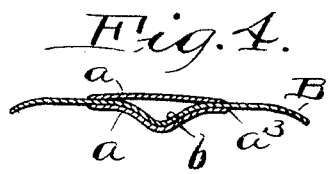

In the drawings, Figure 1 is a perspective view of the finished shovel ready for the insertion of any suitable handle. Fig. 2 is a perspective view of the bell-ended tube after the bell end thereof has been bifurcated. Fig. 3 is a perspective view of such tube after the wings formed by such bifurcation have been cut and pressed into shape. Fig. 4 is a cross-section of the finished shovel on line 4 4 of Fig. 1.

In the practice of the process I take a seamless drawn tube and form on one end thereof an enlarged bell $a$, which is united with the tube A by an inclined integral neck $a^4$. This result may be accomplished in any suitable manner, as by spinning or by dies which enlarge one end of the tube to form the bell or which reduce the diameter of the other end of said tube. The small end or handle-socket of the resulting structure has its end notched so as to form two V-shaped projections $a'$, and this is done to prevent there being any transverse line over which the handle might be strained or broken. The bell-shaped end $a$ of the tube is bifurcated by two kerfs $a^2$, which extend from its end inward to the neck $a^4$. The two halves of the bell-shaped end are then flattened, and the two wings thus formed are trimmed and shaped to fit the contour of the shovel-blade B. Any suitable mechanism may be employed for the stated purpose. It will be noticed that these two wings, when the device is formed as stated, are integrally joined together at their upper ends on opposite sides of the socket-piece or small end of the tube by what was a part of the neck $a^4$ before these wings were flattened and shaped.

The blade is designated B. It may be formed up with a stiffening-ridge $b$ near its upper edge. It is then inserted into the opening $a^3$ between the two wings, with its upper edge in contact with the part $a^4$, which connects said wings. The wings are then rigidly secured to the blade, as by welding or riveting.

Having described my invention, I claim—

The process of producing a shovel consisting in shaping a seamless drawn tube to have one enlarged bell-shaped end; in bifurcating said bell end by kerfs extending up to the neck thereof, in then flattening and shaping the two wings formed by so splitting said portion, thereby forming two properly-shaped wings whose upper edges on opposite sides of the tube are integrally connected by what was the neck of the bell part thereof; in inserting a shovel-blade between said wings and securing it to them.

In testimony whereof I hereunto affix my signature in the presence of two witnesses.

WALLACE S. JUDD.

Witnesses:
E. L. THURSTON,
B. W. BROCKETT.